(12) United States Patent
Wirth (10) Patent No.: US 8,454,898 B2
(45) Date of Patent: Jun. 4, 2013

(54) EXHAUST GAS TREATMENT DEVICE

(75) Inventor: Georg Wirth, Kirchheim/Teck (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 240 days.

(21) Appl. No.: 12/410,581

(22) Filed: Mar. 25, 2009

(65) Prior Publication Data

US 2009/0241512 A1    Oct. 1, 2009

(30) Foreign Application Priority Data

Mar. 27, 2008   (DE) .......................... 10 2008 016 236

(51) Int. Cl.
*B01D 53/88* (2006.01)
*B01D 53/92* (2006.01)

(52) U.S. Cl.
USPC .......................................... 422/179; 422/180

(58) Field of Classification Search
USPC ..................... 422/179, 180, 221; 55/493, 502
See application file for complete search history.

(56) References Cited

U.S. PATENT DOCUMENTS

| | | | |
|---|---|---|---|
| 4,004,887 A * | 1/1977 | Stormont ....................... | 422/179 |
| 4,043,761 A * | 8/1977 | Gaysert et al. ................ | 422/179 |
| 4,101,280 A | 7/1978 | Frietzsche et al. | |
| 4,115,071 A * | 9/1978 | Masuda et al. ................ | 422/179 |
| 4,145,394 A * | 3/1979 | Abthoff et al. ................ | 422/179 |
| 4,155,980 A * | 5/1979 | Santiago et al. .............. | 422/180 |
| 4,235,846 A | 11/1980 | Abthoff et al. | |
| 4,344,922 A | 8/1982 | Santiago et al. | |
| 4,353,873 A | 10/1982 | Noritake et al. | |
| 5,082,479 A | 1/1992 | Miller | |
| 5,186,906 A * | 2/1993 | Kawakami et al. ........... | 422/180 |
| 5,555,621 A * | 9/1996 | Tanabe et al. .................. | 29/890 |
| 5,916,530 A * | 6/1999 | Maus et al. .................... | 422/179 |
| 6,635,227 B1 | 10/2003 | Shibata et al. | |
| 7,662,204 B2 * | 2/2010 | Forster et al. .................. | 55/523 |
| 2003/0108457 A1 | 6/2003 | Gault et al. | |
| 2004/0139741 A1 | 7/2004 | Balle et al. | |
| 2007/0011874 A1 * | 1/2007 | Myers .......................... | 422/179 |

FOREIGN PATENT DOCUMENTS

| | | |
|---|---|---|
| CN | 1341035 A | 3/2002 |
| DE | 2 222 663 | 12/1973 |
| DE | 23 64 425 | 7/1975 |
| DE | 103 00 780 A1 | 7/2004 |
| DE | 103 60 726 A1 | 7/2005 |
| EP | 1 236 872 A1 | 9/2002 |

\* cited by examiner

*Primary Examiner* — Jill Warden
*Assistant Examiner* — Joye L Woodard
(74) *Attorney, Agent, or Firm* — Reinhart Boerner Van Deuren P.C.

(57) ABSTRACT

The invention relates to an exhaust gas treatment device for an exhaust gas system of an internal combustion engine, in particular in a motor vehicle, having at least one exhaust gas treatment element, which is supported radially on a housing by a bearing material and is supported axially on the housing by a supporting device, such that the supporting device has a carrier which is connected to the housing by at least one connection site and has at least one receptacle for holding a supporting material which is in contact with the exhaust gas treatment element axially such that the carrier has a cross-sectional contour that widens from the respective receptacle to the respective connection site in the axial direction.

9 Claims, 6 Drawing Sheets

EXHAUST GAS TREATMENT DEVICE

CROSS-REFERENCE TO RELATED PATENT APPLICATIONS

This patent application claims the benefit of co-pending German Patent Application No. DE 102008016236.1, filed on Mar. 27, 2008, the entire teachings and disclosure of which are incorporated herein by reference thereto.

FIELD OF THE INVENTION

The present invention relates to an exhaust gas treatment device for an exhaust system of an internal combustion engine, in particular in a motor vehicle.

BACKGROUND OF THE INVENTION

Exhaust gas treatment devices, e.g., catalysts and particulate filters, usually have at least one exhaust gas treatment element, namely in particular at least one particulate filter element or at least one catalyst element. The respective exhaust gas treatment element is supported radially on a housing of the exhaust gas treatment device over a bearing material. The bearing material may be a bearing mat, which is pressed radially into the housing on insertion of the exhaust gas treatment element. The bearing material protects the exhaust gas treatment element from coming directly in contact with the housing and also has a vibration-damping effect, for example. This is necessary in particular when the respective exhaust gas treatment element is made of a very stiff or brittle material. For example, such exhaust gas treatment elements are made of a ceramic material, e.g., cordierite, in which case the respective exhaust gas treatment element may also be manufactured as a monolith. In addition, the bearing material usually has an axial fixation of the exhaust gas treatment element inside the housing.

The flow-through resistance of the exhaust gas treatment element introduces into the exhaust gas treatment element an axial force that drives the respective exhaust gas treatment element in the direction of flow of the exhaust gas. With a greater burden on the exhaust gas treatment element, e.g., with soot or any other impurities, the flow-through resistance of the exhaust gas treatment element increases. Furthermore, vibrations occurring during driving operation, e.g., in off-road operation of a vehicle, may likewise produce a longitudinal acceleration of the exhaust gas treatment element relative to its housing. Axial contact between the exhaust gas treatment element and the housing is to be avoided to reduce the risk of damage to the exhaust gas treatment element. It is fundamentally possible to support the exhaust gas treatment element axially on the housing with the help of a supporting device. Such a supporting device may have, for example, a receptacle for holding a wire mesh ring, which is supported axially on the respective exhaust gas treatment element. Said receptacle may then in turn be attached directly to the housing.

However, it has been found that extremely high compressive forces act on the respective exhaust gas treatment element in exhaust gas treatment systems designed for large-volume internal combustion engines, but this leads to a high load on the supporting device accordingly. Furthermore, with exhaust gas treatment elements of a large size, the bearing material must also be of large dimensions accordingly, so a radial gap which must be bridged with the help of the respective supporting device also becomes larger accordingly. In the case of a receptacle attached directly to the housing, this leads to greater loads due to the greater lever forces. Accordingly, with unfortunate constellations of load state and driving operation, there may be damage to the supporting device, which leads to the risk of damage to the exhaust gas treatment element.

BRIEF SUMMARY OF THE INVENTION

The present invention relates to the problem of providing an improved embodiment for an exhaust gas treatment device of the type defined in the introduction, which is characterized in particular in that it allows effective axial support of the exhaust gas treatment element on the housing.

This problem is solved according to this invention by the subject of the independent claim. Advantageous embodiments are the subject of the dependent claims.

The invention is based on the general idea of separating the holding function for holding and positioning the supporting material relative to the exhaust gas treatment element from the supporting function for providing axial support for the supporting device on the housing. In this regard, the invention proposes a carrier, which is attached to the housing at one end by at least one connection site and on the other end has at least one receptacle for holding a supporting material which is in contact axially with the respective exhaust gas treatment element. In addition, the carrier has a special cross-sectional contour, which facilitates the axial transfer of force between the respective receptacle and the housing. In this regard, the carrier is designed so that its cross section widens in the axial direction from the respective receptacle to the respective connection site. To this extent, the carrier is designed with a conical shape. Due to this special cross-sectional shape, the carrier is able to transfer axial forces especially effectively from the respective receptacle to the housing without resulting in excessive bending stress on the carrier. Instead, the carrier is subjected mainly to tensile stress or mainly to compressive stress, depending on the design. Comparatively large forces can be transmitted in this way between the exhaust gas treatment element and the housing without leading to failure of the supporting device.

An embodiment in which the supporting material is a wire mesh such that the supporting material can form a ring body in particular is especially advantageous. In this way, a closed ring-shaped axial support of the exhaust gas treatment element in the circumferential direction can be achieved.

The receptacle for holding and positioning the respective supporting material may be implemented on the carrier in various ways. For example, the receptacle may be formed by a component that is manufactured separately from the carrier and is attached to the carrier. Alternatively, the receptacle may also be integrally molded onto the carrier. In an especially expedient embodiment, the receptacle consists of two receptacle sections, one of which is integrally molded on the carrier, while the other is formed by a component manufactured separately from the carrier but added onto it.

According to an especially advantageous embodiment, the carrier may be attached to the housing by several connection sites spaced a distance apart from one another in the circumferential direction, whereby the carrier is at a distance from the housing between neighboring connection sites. The carrier may be embodied in the form of a dome or arch between two neighboring connection sites in particular. These embodiments are based on the finding that a sufficient transfer of force is implementable already with a segmented support. These embodiments make it possible in particular to arrange probes or sensors between neighboring connection sites, such that pressures, temperatures and exhaust gas composition, for example, can be sensed with them.

Other important features and advantages of the invention are derived from the dependent claims, the drawings and the respective description of figures on the basis of the drawings.

It is self-evident that the features mentioned above and those yet to be explained below may be used not only in the particular combination given but also in other combinations or alone without going beyond the scope of the present invention.

Other aspects, objectives and advantages of the invention will become more apparent from the following detailed description when taken in conjunction with the accompanying drawings.

BRIEF DESCRIPTION OF THE DRAWINGS

Preferred exemplary embodiments of the present invention are illustrated in the drawings and are explained in greater detail in the following description, where the same reference numerals refer to the same or similar components or those having the same function.

In the drawings schematically.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
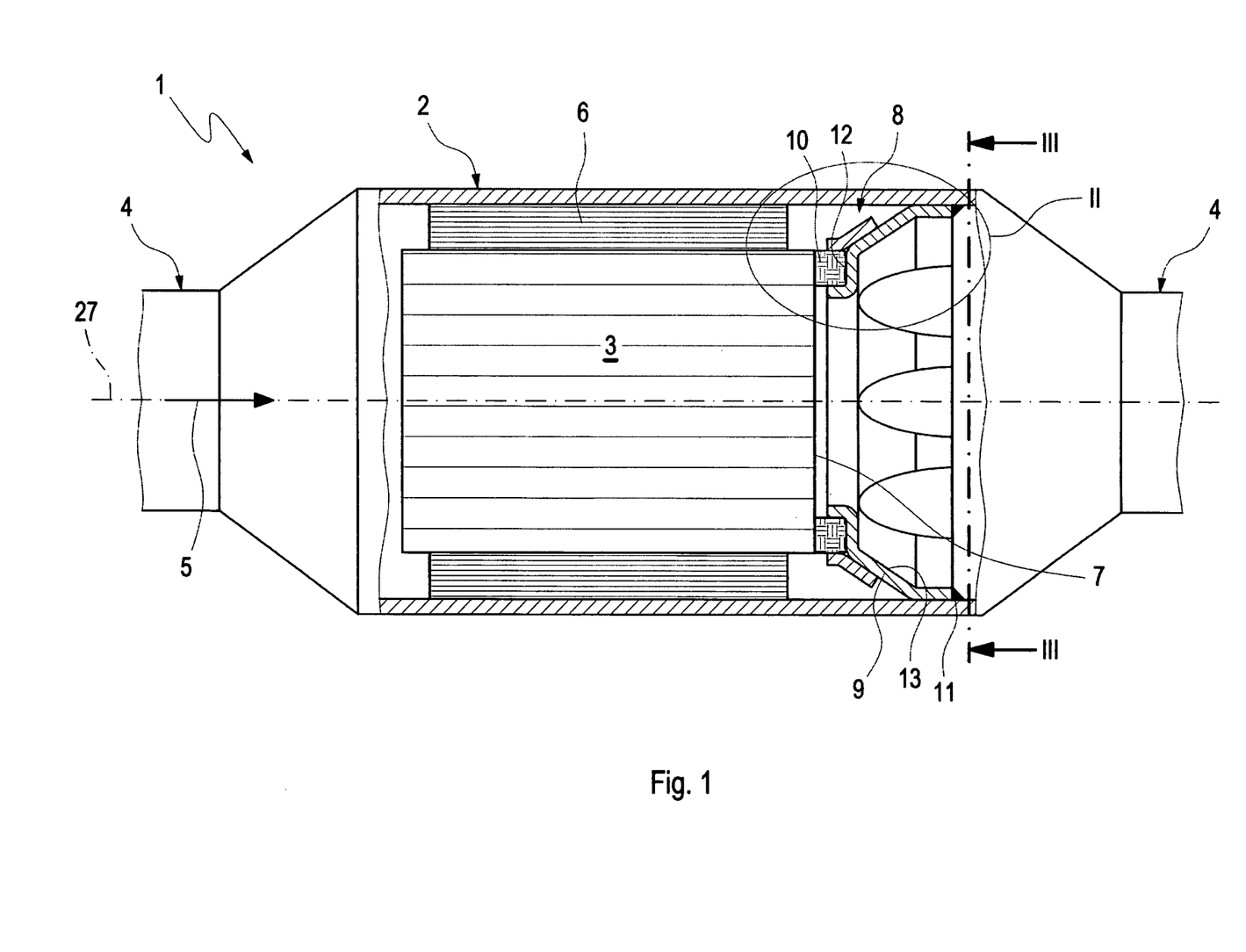
FIG. 1 shows a highly simplified longitudinal section through an exhaust gas treatment system.

According to FIG. 1, an exhaust gas treatment device 1 has a housing 2 in which at least one exhaust gas treatment element 3 is situated. The exhaust gas treatment device 1 is for use in an exhaust system 4, shown here only partially, of an internal combustion engine, which may be installed in a motor vehicle. For example, the exhaust gas treatment device 1 may comprise a particulate filter, in particular a soot filter or a catalyst, in particular an oxidation catalyst. Accordingly, the at least one respective exhaust gas treatment element 3 is a particulate filter element or a catalyst element. In a preferred embodiment of such exhaust gas treatment devices 1, the respective exhaust gas treatment element 3 is made of a ceramic material, such that it may be embodied as a monolith in particular.

In the example, only a single exhaust gas conversion element 3 is shown. It is clear that the exhaust gas treatment device 1 may essentially also contain several exhaust gas treatment elements 3, which may be arranged in series, in particular in series in the axial direction, which coincides with a direction of flow 5 indicated by an arrow.

The exhaust gas treatment element 3 is supported radially on the housing 2 by a bearing material 6. The bearing material 6 is preferably a bearing mat surrounding the exhaust gas treatment element 3 along the outside circumference. The bearing material 6 may be a fiber material, in particular a ceramic fiber material. Expediently in assembly of the exhaust gas treatment device 1, the bearing material 6 may be pressed radially between the exhaust gas treatment element 3 and the housing 2, thereby implementing a radial positioning and fixation of the exhaust gas treatment element 3 relative to the housing 2. Due to settling and aging phenomena, the radial pressure and thus the holding force of the bearing material 6 may subside during operation of the exhaust gas treatment device 1. In addition, in particular for high axial loads, extensive axial support of the exhaust gas treatment element 3 on the housing 2 is necessary, namely in the area of the outflow end 7 of the exhaust gas treatment element 3. High axial forces which act on the exhaust gas treatment element 3 and drive the exhaust gas treatment element 3 in the direction of flow 5 of the exhaust gases occur in particular when the flow resistance of the exhaust gas treatment element 3 increases due to an increasing burden of impurities. Furthermore, vibrations which accelerate the exhaust gas treatment element 3 axially, i.e., parallel to the direction 5 of flow of the exhaust gas may also occur during operation of the vehicle equipped with this exhaust gas system 4. Such vibrations may occur in off-road operation of the vehicle in particular.

For the axial support of the exhaust gas treatment element 3 on the housing 2, a supporting device 8 is provided accordingly. It has a carrier 9 as well as a supporting material 10. The carrier 9 is connected to the housing 2 by at least one connection site 11 and has at least one receptacle 12 which is designed for holding the supporting material 10. The respective receptacle 12 holds the supporting material 10 in such a way that it is in axial contact with the outflow end 7 of the exhaust gas treatment element 3. The carrier 9 is also designed so that the axial direction, i.e., in the direction 5 of flow of the exhaust gas, it has a cross-sectional contour 13, which widens from the respective receptacle 12 to the respective connection site 11. In this way, the carrier 9 has a conical profile in longitudinal section and/or has a conical cross-sectional contour 13.

Supporting material 10 is preferably a wire mesh, which may be compressed, allowing an extremely stable but elastically yielding support on the exhaust gas treatment element 3. The elasticity of the wire mesh material 10 ensures that pressure peaks within a contact area between the supporting material 10 and the exhaust gas treatment element 3 are prevented. The supporting material 10 preferably has a ring body having a closed contour in the circumferential direction. In this way a uniform support with comparatively minor supporting forces for the exhaust gas treatment element 3 can be implemented.

The receptacle 12 is expediently designed as a groove which is formed in a ring shape and may be U-shaped in profile, so that it fits with the ring-shaped supporting material 10. Furthermore, this groove is open axially toward the exhaust gas treatment element 3. The supporting material ring body 10 is inserted axially into this receiving groove 12. The supporting material 10 can be pressed radially, so that it is sufficiently secured in the receiving groove 12.

Figure 3:
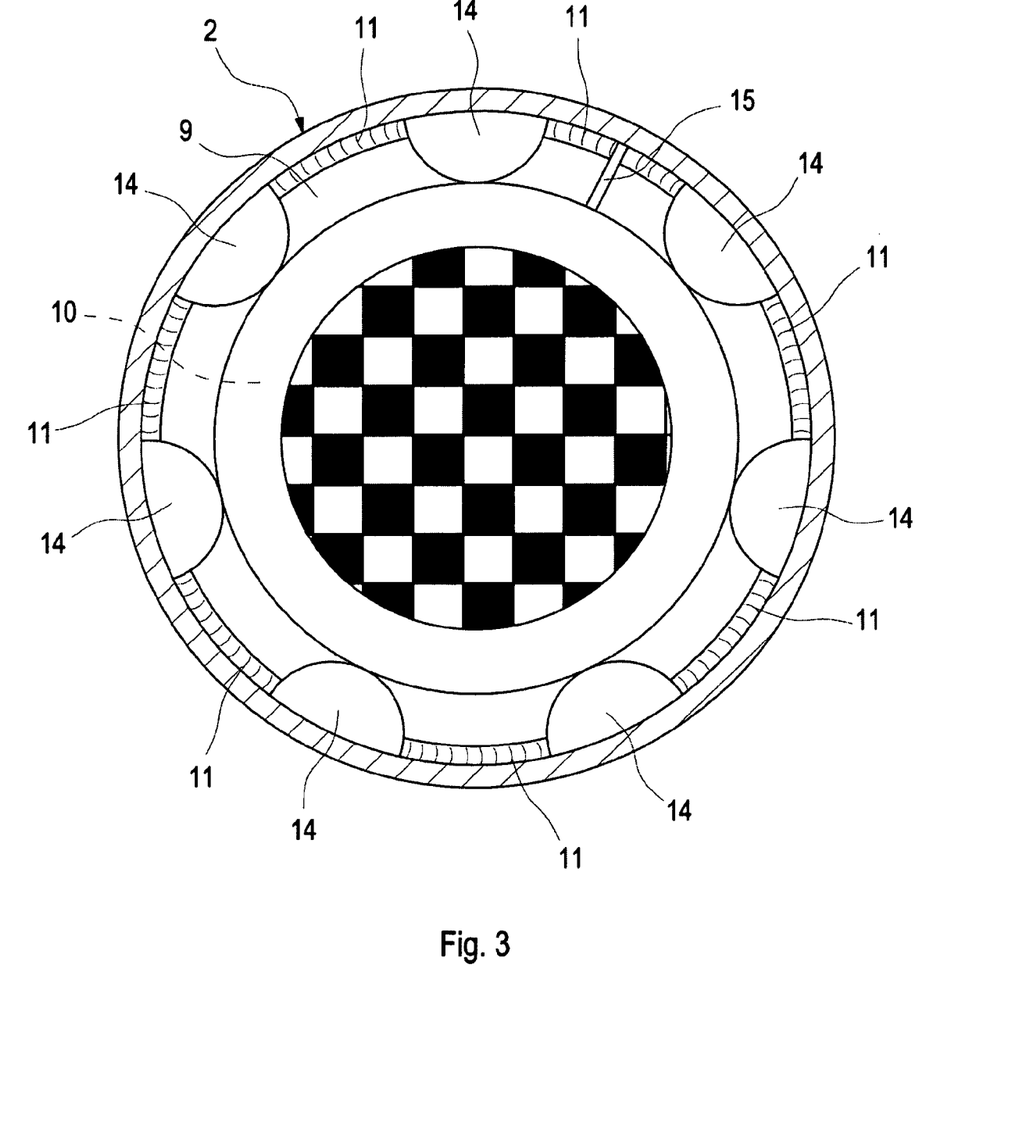
FIG. 3 shows an axial section through the exhaust gas treatment device according to sectional lines III in FIG. 1.

FIG. 3 shows a checkerboard structure of the exhaust gas treatment element 3, which should indicate an alternating arrangement of closed and open axial channels. Such an arrangement of closed and open channels is found in a particulate filter in particular. However, such a design for the exhaust gas treatment element 3 is known in general and therefore need not be explained further. The supporting material 10 is preferably supported axially on the exhaust gas treatment element 3 relatively far toward the outside in the area of an outside circumference, so that the smallest possible flow-through cross section of the exhaust gas treatment element 3 is covered by the supporting material 10. Use of a wire mesh as the supporting material 10 also has the advantage here that channels of the exhaust gas treatment element 3 also covered with it are not closed by the supporting material 10 because the wire mesh is not designed to be airtight.

The carrier 9 may essentially be designed in a ring shape. The carrier 9 may expediently be mounted on the housing 2 by a single connection site 11, in particular designed in a ring shape. The connection site 11 may be implemented by a weld, for example. Alternatively, it is also possible to mount the carrier 9 on the housing 2 by several connection sites 11 spaced a distance apart from one another in the circumferential direction. It is possible in particular according to FIG. 3 to design the carrier 9 so that it is a distance away from the housing 2 radially between neighboring connection sites 11. The carrier 9 may be designed in the form of a dome or an arch between two neighboring connection sites 11 according to a preferred embodiment illustrated in FIG. 3. In this way, axial through-openings 14 are formed between neighboring connection sites 11, which may be tack welds, for example. Such through-openings lead to a reduction in the weight of the carrier 9 on the one hand and thus of the supporting device 8. On the other hand, these through-openings 14 can be readily utilized for passing sensors or probes or the like (not shown here) through the supporting device 8 to measure the pressure, temperature and/or exhaust gas composition, for example.

FIG. 3 also shows a special embodiment in which the essentially ring-shaped carrier 9 and also the ring-shaped receptacle 12 additionally or alternatively have an interruption 15 in the form of a slot or a gap in the circumferential direction. In this way, the supporting device 8 may be adapted to different diameters of the housing 2 as part of its installation. In this way, the supporting device 8 has a relatively high tolerance tolerability. According to FIG. 3, the interruption 15 may expediently be situated in the area of one of the connection sites 11. In this way, once the dimension of the carrier 9 and/or the receptacle 12 has been set and/or adjusted, it is fixed in the installed state.

Figure 4:
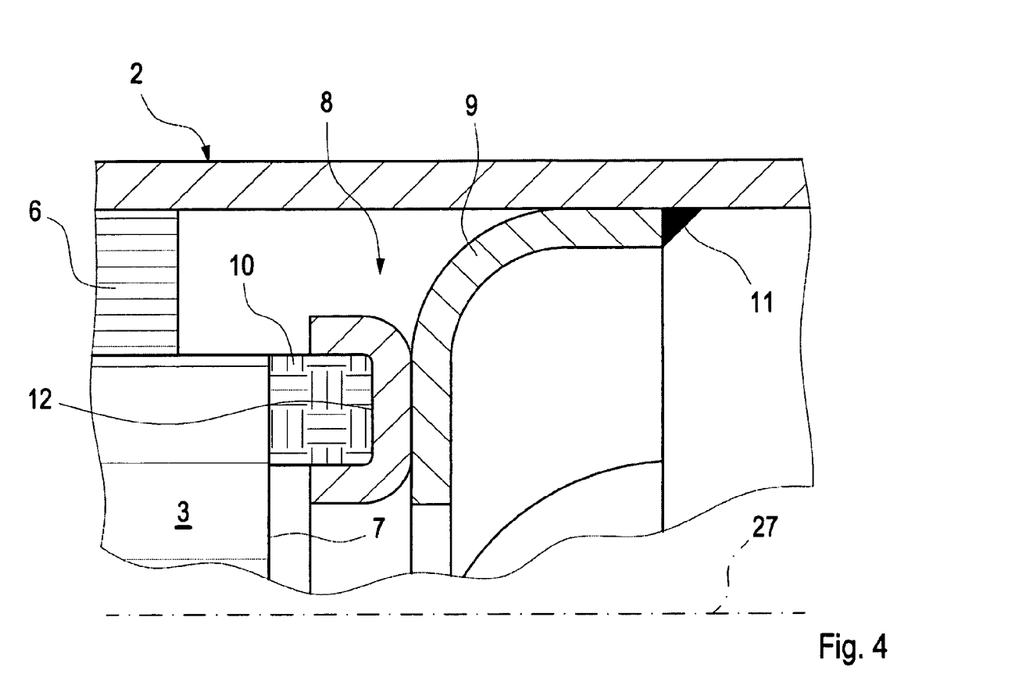
FIGS. 4-9 show detailed views like that in FIG. 2 but showing different embodiments.

According to FIGS. 2 and 4 through 9, there are different possibilities for the implementation of the receptacle 12, which are illustrated here only as examples. For example, the receptacle 12 may be formed by a component that is manufactured separately from the carrier 9 and added onto the carrier 9. Such an embodiment is shown in FIG. 4, for example. As an alternative to this, the receptacle 12 may also be integrally molded on the carrier 9. Such an integral design is shown as exemplary of the embodiments of FIGS. 6 through 9. Alternatively, a mixed design is also conceivable, in which the receptacle 12 consists of two receptacle sections 16, 17 according to the embodiments of FIGS. 2 and 5. The one receptacle section 16 is integrally molded on the carrier 9 while the other receptacle section 17 forms a component manufactured separately from the carrier 9 and added onto the carrier 9. For example, this separate receptacle section 17 is fixedly attached to the carrier 9 and/or to the other and/or integral receptacle section 16 by spot welds or tack points 18.

Figure 2:
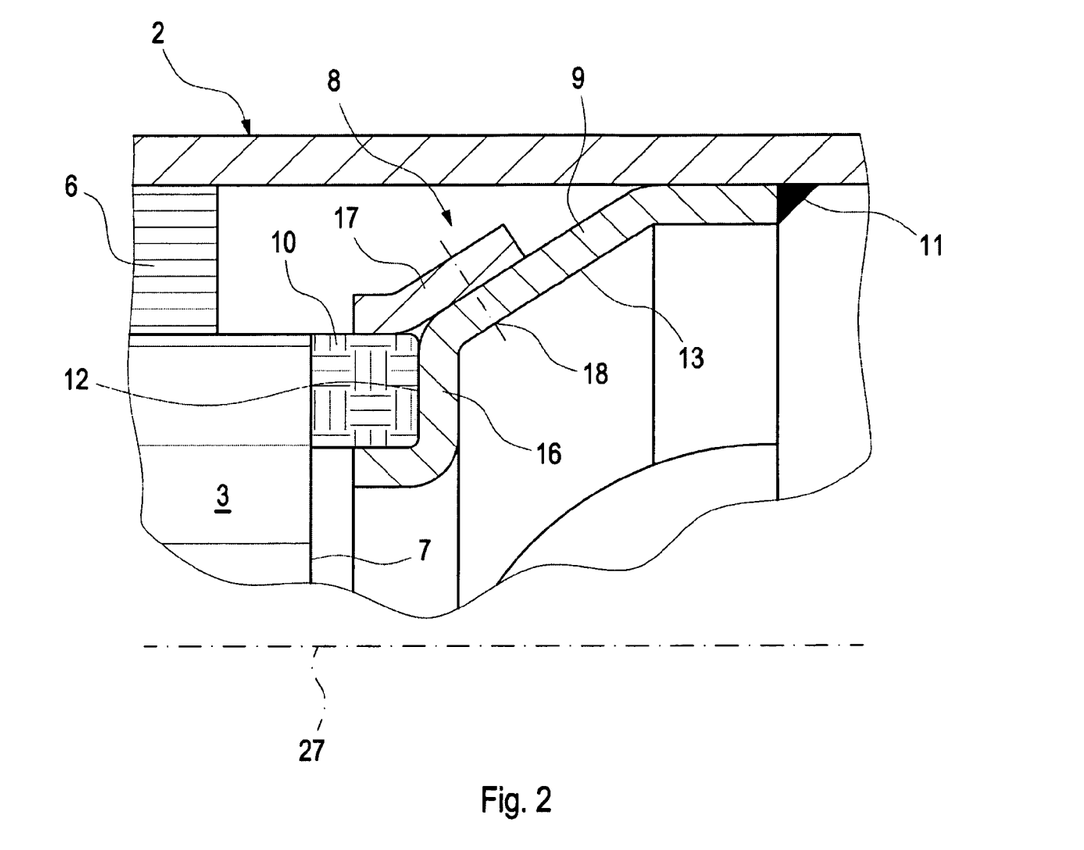
FIG. 2 shows an enlarged detail II from FIG. 1.
Figure 5:
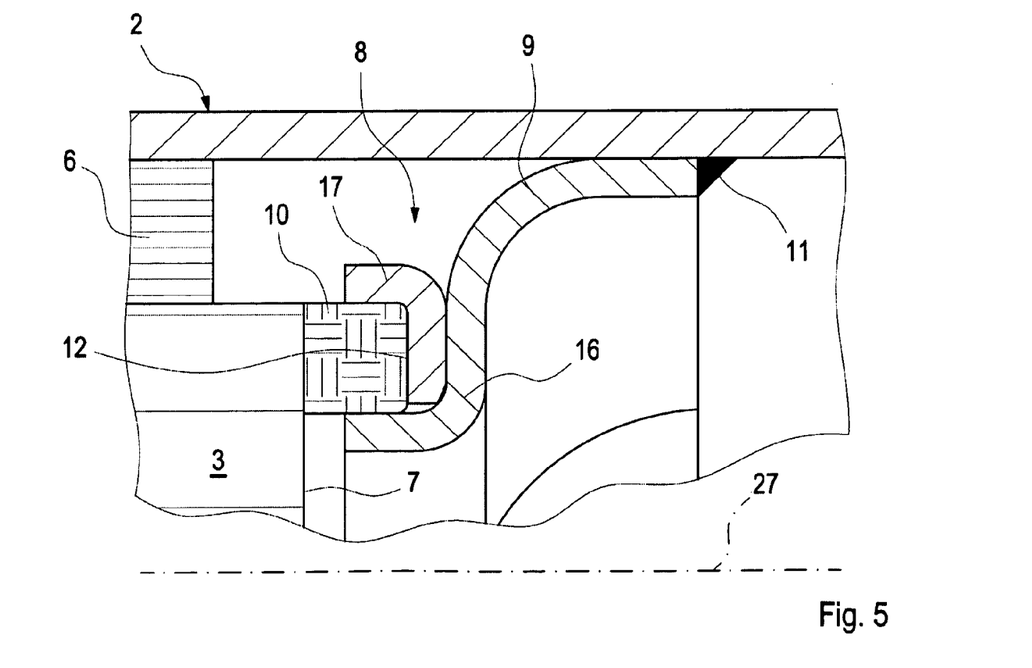

In the embodiments of FIGS. 2, 4 and 5, the respective connection site 11 is arranged at a distance axially from the exhaust gas treatment element 3. The respective connection site 11 is downstream with regard to the direction of flow 5 from the outflow end 7 of the exhaust gas treatment element 3. In this way, the respective carrier 9 is essentially subjected to compressive stress during operation of the exhaust gas treatment device 1.

In contrast with that, FIGS. 6 through 9 show embodiments in which the carrier 9 is designed so that the respective connection site 11 is arranged axially inside the exhaust gas treatment element 3 as the connection site 11 is positioned axially between the inflow and outflow ends of the exhaust gas treatment element. The respective connection site 11 is then situated upstream from the outflow end 7 of the exhaust gas treatment element 3 with respect to the direction 5 of flow. In these embodiments, the carrier 9 is subjected mainly to tensile stress during operation of the exhaust gas treatment device 1.

Figure 6:
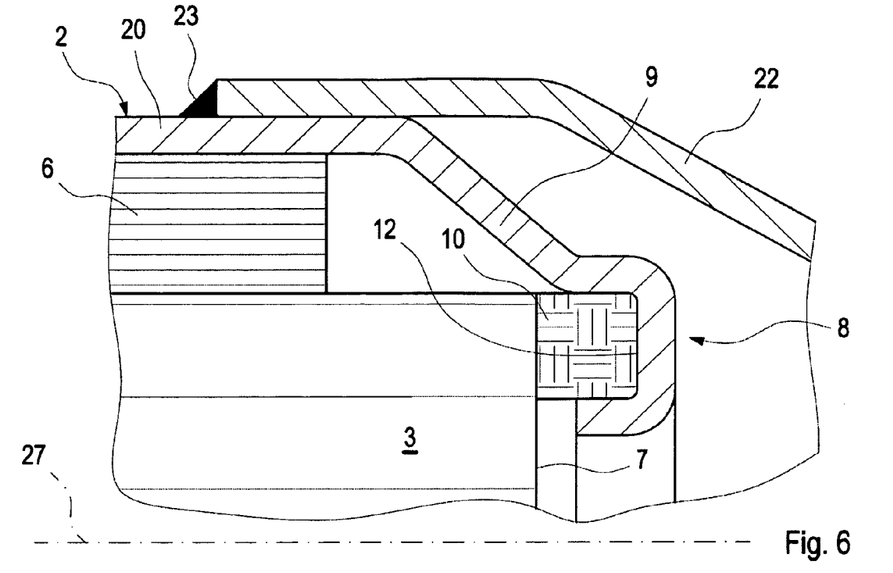

The carrier 9 can be implemented in various ways. For example, the carrier 9 may be integrally molded on the housing 2. Such an embodiment is shown in FIG. 6, for example, where the otherwise cylindrical housing 2 has an end section which forms the carrier 9 and on which the receptacle 12 can be integrally molded.

Figure 7:
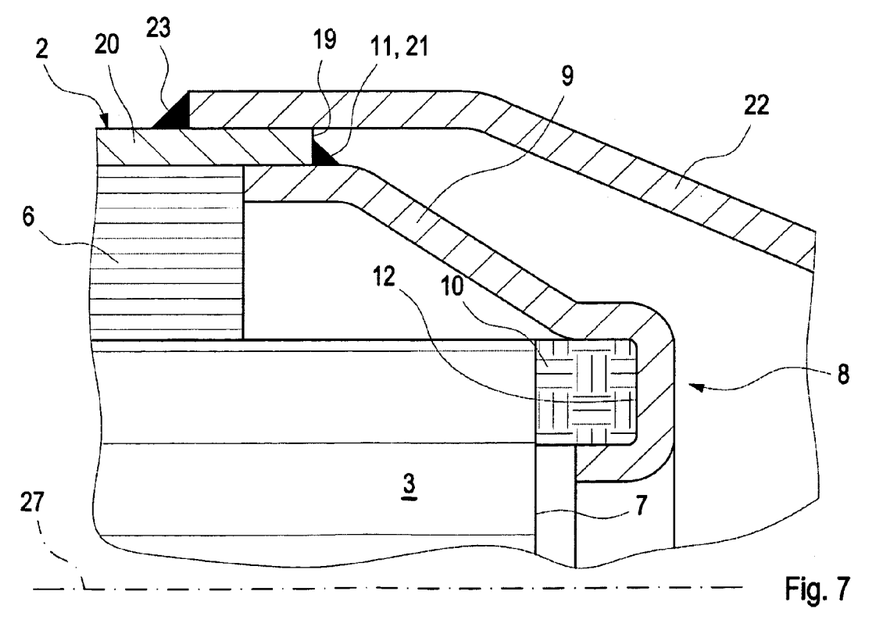

The other FIGS. 2, 4, 5 and 7 through 9 show embodiments in which the carrier 9 is formed by a part manufactured separately from the housing 2 and attached to the housing 2 in a suitable manner. The carrier 9 can easily be attached permanently to the housing 2 within a cylindrical area of the housing 2, e.g., by suitable spot welds or tack points. In contrast with that, FIG. 7 shows an embodiment in which the carrier 9 is connected to an axial end edge 19 of a cylindrical jacket 20 of the housing 2, e.g., by corresponding welds 21. The carrier 9 may be inserted axially into the jacket 20. In the area of the supporting device 8, the housing 2 is supplemented here by a funnel 22, which can be attached to the jacket 20 on the outside, for example, and may be connected to the jacket 20 on the outside with a corresponding weld 23 in an airtight manner.

Figure 8:
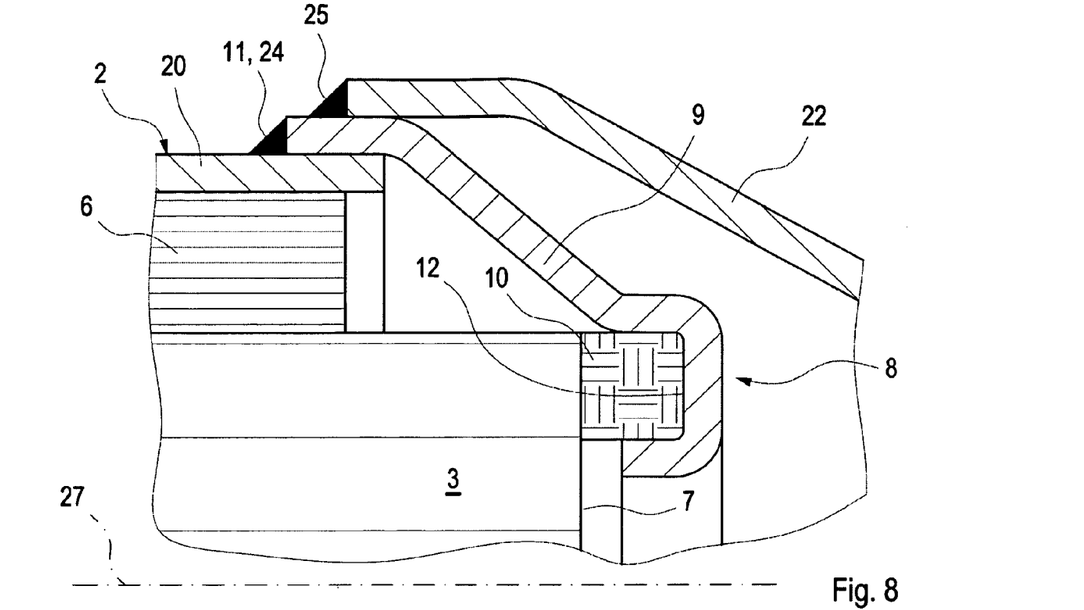

In the embodiment shown in FIG. 8, the carrier 9 is attached to the jacket 20 on the outside and is secured on the housing 2 by a corresponding connection site 11 on the outside, said connection site being formed in particular by a peripheral weld 24. In this embodiment, the funnel 22 is then attached to the carrier 9 on the outside and is secured there with a peripheral weld 25 on the carrier 9 as an example. Likewise, it is fundamentally possible to connect the carrier 9 and the funnel 22 to the jacket 20 by a shared weld.

Figure 9:
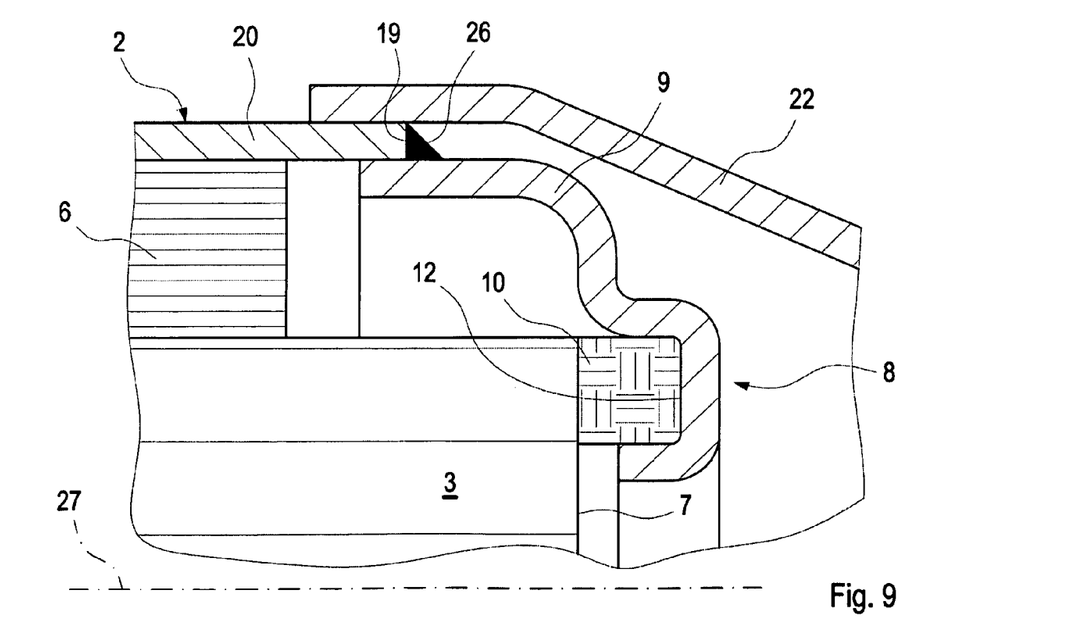

FIG. 9 shows another embodiment in which the carrier 9 is inserted into the jacket 20 and in which the funnel 22 is attached to the jacket 20 on the outside. In this example, a shared weld 26 is used for attaching the carrier 9 to the jacket 20 and the funnel 22 to the jacket 20, said weld being arranged on the inside of the housing 2 and arranged on the axial end face 19 of the jacket 20. In FIGS. 1, 2 and 4 through 9, a longitudinal central axis 27 of the exhaust gas treatment device 1 is also indicated by a dash-dot line.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An exhaust gas treatment device for an exhaust system of an internal combustion engine, in particular in a motor vehicle, the exhaust gas treatment device comprising:
   at least one exhaust gas treatment element extending axially between an upstream inflow end and a downstream outflow end that is supported radially on a housing by a bearing material and is supported axially on the housing at the downstream outflow end by a supporting device;
   wherein the supporting device has a carrier, which is connected to the housing by at least one connection site and has at least one receptacle for holding a supporting material in axial contact with the exhaust gas treatment element;
   wherein the carrier has a cross-sectional contour, which widens in the axial direction from the respective receptacle to the respective connection site; and
   wherein the carrier is attached to the housing by several connection sites spaced a distance apart from one another in the circumferential direction; and
   wherein the carrier is spaced a distance apart from the housing between neighboring connection sites forming an axial through-opening radially between the carrier and the housing between neighboring connection sites.

2. The exhaust gas treatment device according to claim 1, wherein the receptacle has a ring-shaped groove that is open axially toward the exhaust gas treatment element and has a U-shaped profile.

3. The exhaust gas treatment device according to claim 1, wherein the carrier includes a substantially arch shaped portion extending between neighboring connection sites, the axial through-opening being formed radially between the substantially arch shaped portion extending between neighboring connection sites and the housing.

4. The exhaust gas treatment device according to claim 3, wherein the carrier is substantially ring shaped, the arch shaped portion extends angularly along a portion of a circumference of the ring shaped carrier between the neighboring connection sites.

5. The exhaust gas treatment device of claim 3, wherein the arch shaped portions decrease in circumferential width as the carrier extends radially outward from and axially away from the receptacle toward the respective connection site.

6. The exhaust gas treatment device according to claim 1, wherein the axial through-opening between the housing and the carrier permits fluid communication between an upstream side of the carrier with a downstream side of the carrier through the axial through-opening.

7. The exhaust gas treatment device of claim 1, wherein the carrier includes a conical section extending between the receptacle and the connection sites, the through-openings extending through the conical section.

8. An exhaust gas treatment device for an exhaust system of an internal combustion engine, in particular in a motor vehicle, the exhaust gas treatment device comprising:
   at least one exhaust gas treatment element that is supported radially on a housing by a bearing material and is supported axially on the housing by a supporting device;
   wherein the supporting device has a carrier, which is connected to the housing by at least one connection site and has at least one receptacle for holding a supporting material in axial contact with the exhaust gas treatment element;
   wherein the carrier has a cross-sectional contour, which widens in the axial direction from the respective receptacle to the respective connection site; and
   wherein the exhaust gas treatment element extends axially between upstream and downstream ends, the at least one connection site is arranged axially inside the exhaust gas treatment element and axially between the upstream and downstream ends.

9. The exhaust gas treatment device of claim 7, wherein the conical section is located radially outward from the receptacle.

* * * * *